Smith & Wood,
Hydrant.
No. 86,466. Patented Feb. 2, 1869.
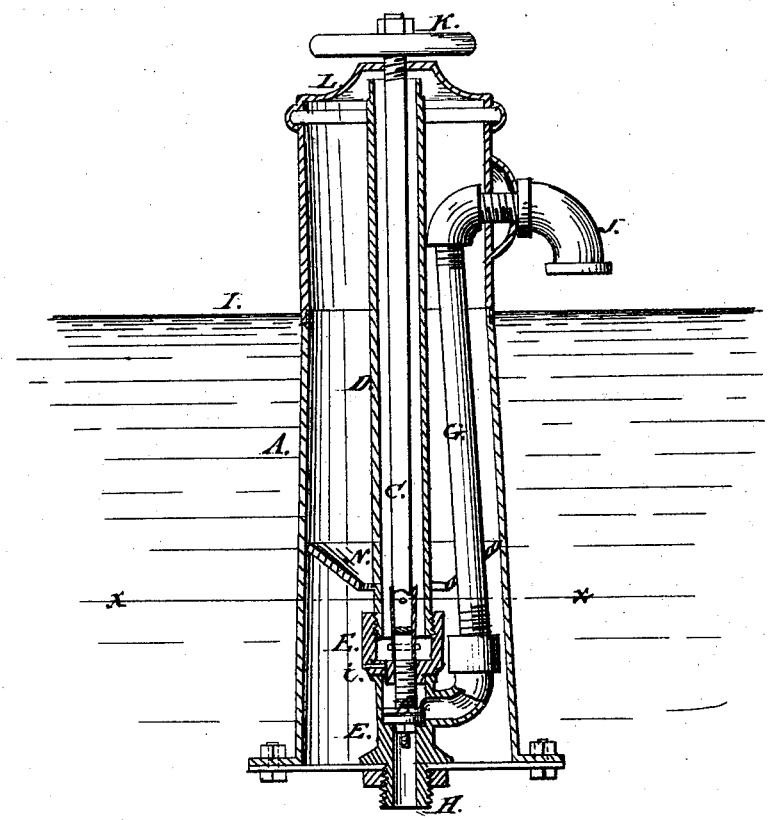
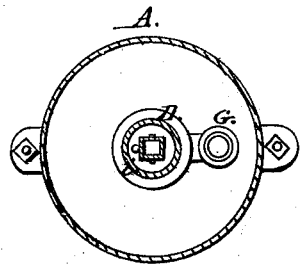
Witnesses:
W. C. Ashkettle
Wm. A. Morgan
Inventor:
J. J. Smith
L. Wood
Per
Munn & Co.
Attorneys

JAMES J. SMITH AND SAMUEL WOOD, OF CLEVELAND, OHIO.

Letters Patent No. 86,466, dated February 2, 1869.

IMPROVEMENT IN HYDRANTS.

The Schedule referred to in these Letters Patent and making part of the same.

*To all whom it may concern:*

Be it known that we, JAMES J. SMITH and SAMUEL WOOD, of Cleveland, in the county of Cuyahoga, and State of Ohio, have invented a new and useful Improvement in Hydrant and Street-Washer; and we do hereby declare that the following is a full, clear, and exact description thereof, which will enable those skilled in the art to make and use the same, reference being had to the accompanying drawings, forming part of this specification.

This invention relates to new and useful improvements in hydrants and street-washers for street-mains, whereby they are rendered more efficient, convenient, and simple than they have hitherto been; and The invention consists in the general construction and arrangement of parts, as hereinafter described.

Figure 1 represents a sectional elevation of the hydrant, showing the parts of which it is composed in their proper positions.

Figure 2 is a cross-section of fig. 1, through the line x x.

Similar letters of reference indicate corresponding parts.

A represents the outer casing, which is made tapering from the base up to a point above the surface of the ground, for the purpose of securing it more firmly in the earth, and to prevent its being moved by the action of the frost.

B is the valve on the end of the valve-rod C.

D is a tube, which surrounds the valve-rod, and is attached to the upper portion of the shell.

E represents the shell of the hydrant, which is formed of two pieces, E and E'.

G is the discharge-pipe, connected with the shell E, as seen in the drawing.

The part of the shell marked E' screws into E, and its lower portion forms a nut for the screw on the valve-rod.

By turning or revolving the valve-rod, or screwing or unscrewing the rod in the nut E', the valve B is raised or lowered, and water admitted to the hydrant or shut off from it.

The shell is attached to the casing A, and the casing is placed beneath the surface of the ground, and connected with the water-main by the pipe marked H.

I indicates the surface of the ground.

J is the nozzle attached to the discharge-pipe G; but the arrangement for the discharge of water is such that a hose-pipe may be attached when desired.

K is the hand-wheel attached to the top end of the valve-rod for operating the valve.

L is the cap of the hydrant, covering the end of the case, and forming a guide for the valve-rod, as seen.

The top end of the tube D is flattened, so that a wrench can be placed upon it, and the tube and part E' can be unscrewed from the shell E, and the valve and working-parts of the hydrant can be removed at any time, for inspection or repairs; but before this can be done, the cap L must be removed.

N is a funnel-shaped guide-plate attached to the casing A, for guiding the parts when they are to be replaced, as without such guide it would be difficult to replace them when once removed, while the shell and casing were buried in the earth, as represented.

Through the bottom of the part E', and from it outside, there is a waste-orifice, seen at i.

When the valve B is closed, this orifice is in communication with the discharge-pipe G, so that any water remaining in the pipe may be drawn therefrom, and freezing in the pipe prevented.

When the valve is raised, the communication between the two will be closed.

The valve B is a flat disk, of leather or other elastic material, closing on to a flat seat, or it may be a metallic disk, operating in the same manner.

What we want to have patented is, an improvement in the construction of hydrants and street-washers, i. e., in the attachment of the tube D to the top of the valve-shell E', said tube to enclose the valve-rod C, and to extend above the ground, (as shown in the drawing,) so that, when desired, the working-parts of the valve can be taken out for inspection and repairs, by simply unscrewing said tube D, and lifting out the working-parts through the top of the hydrant, and returned in the same way, without disturbing the earth or hydrant-casing.

This mode of constructing hydrants and street-washers has never, to our knowledge, been used for any similar purposes before.

The tube D acts as a stationary wrench, to unscrew the valve at bottom of hydrant, underground, by applying the power above ground, or, rather, at the top of hydrant. The tube also acts as a protection to the stem and screw of the valve, in preventing sand, gravel, &c., from getting into the working-parts of the valves.

The valve represented in our hydrant, we lay no claim to, as the said valve has been many years in use for the same purpose.

Having thus described our invention,

We claim as new, and desire to secure by Letters Patent—

The combination of the tube D with the shell E', valve-rod C, and casing A, when the valve B is adapted to operate in the shell E, below the shell E, all arranged and operating as herein described, the course of the water being below the valve B and through the pipe G.

JAMES J. SMITH.
SAMUEL WOOD.

Witnesses:
JNO. MCGARVEY,
GEO. HESTER.